(12) United States Patent
Khan et al.

(10) Patent No.: US 8,105,506 B2
(45) Date of Patent: Jan. 31, 2012

(54) LASER-MARKABLE COMPOSITIONS

(75) Inventors: Nazir Khan, Nottingham (GB); Martin Robert Walker, Cheshire (GB)

(73) Assignee: Datalase Ltd., Cheshire (GB)

( * ) Notice: Subject to any disclaimer, the term of this patent is extended or adjusted under 35 U.S.C. 154(b) by 1096 days.

(21) Appl. No.: 10/566,021

(22) PCT Filed: Jul. 26, 2004
(Under 37 CFR 1.47)

(86) PCT No.: PCT/GB2004/003219
§ 371 (c)(1),
(2), (4) Date: Dec. 20, 2007

(87) PCT Pub. No.: WO2005/012442
PCT Pub. Date: Feb. 10, 2005

(65) Prior Publication Data
US 2008/0311311 A1 Dec. 18, 2008

(30) Foreign Application Priority Data

Jul. 30, 2003 (GB) .................................. 0317829.0
Nov. 12, 2003 (GB) .................................. 0326392.8

(51) Int. Cl.
*H01J 31/00* (2006.01)
(52) U.S. Cl. ..................... 252/512; 252/519.34; 524/84; 524/94
(58) Field of Classification Search ................ 252/500, 252/519.34, 512; 523/84, 94
See application file for complete search history.

(56) References Cited

U.S. PATENT DOCUMENTS

| 4,879,338 | A | | 11/1989 | Mercer et al. | |
| 5,567,763 | A | * | 10/1996 | Madan et al. | 524/701 |
| 5,578,120 | A | * | 11/1996 | Takahashi et al. | 106/438 |
| 5,883,176 | A | | 3/1999 | Gerroir et al. | |
| 6,351,063 | B1 | * | 2/2002 | Lee et al. | 313/479 |

FOREIGN PATENT DOCUMENTS

EP 0 407 947 A2 1/1991

* cited by examiner

*Primary Examiner* — Harold Pyon
*Assistant Examiner* — Timothy Chiang
(74) *Attorney, Agent, or Firm* — Saliwanchik, Lloyd & Eisenschenk

(57) ABSTRACT

A laser-markable composition comprises a pigment, a solvent and a conductive polymer that absorbs IR radiation. This can be used to mark a substrate, using a low-energy laser.

5 Claims, No Drawings

LASER-MARKABLE COMPOSITIONS

This application is a National Stage Application of International Application Number PCT/GB2004/003219, filed Jul. 26, 2004; which claims the benefit of United Kingdom Application Nos. 0317829.0, filed Jul. 30, 2003 and 0326392.8, filed Nov. 12, 2003.

FIELD OF THE INVENTION

This invention relates to a composition that is capable of being printed onto a substrate, by use of a laser.

BACKGROUND OF THE INVENTION

Various proposals have been made, in order to achieve effective printing on a substrate, by causing a change of colour in the substrate on which the printing is to appear. Various pigments have been proposed, which can be used to mark a substrate on the application of laser energy. Some of these proposals may be found in, for example, WO00/43456, JP-A-11001065, EP-A-0522370, EP-A-0797511, U.S. Pat. No. 5,053,440, U.S. Pat. No. 5,350,792 (a plastics moulding composition comprising a polyoxymethylene and animal charcoal), U.S. Pat. No. 5,928,780, U.S. Pat. No. 6,017,972 and U.S. Pat. No. 6,019,831. U.S. Pat. No. 5,489,639 and U.S. Pat. No. 5,884,079 disclose that copper hydroxy phosphate is a laser-markable material.

Ammonium octamolybdate, having the formula $(NH_4)_4 Mo_8O_{26}$ and abbreviated herein as AOM, is a readily available material that has fire-retardant properties. The particular utility of AOM and related compounds as laser-markable materials is disclosed in WO02/07458. As also disclosed there, AOM is readily available, and is selective for a robust, low-power $CO_2$ laser operating at about 10,600 nm.

SUMMARY OF THE INVENTION

Whereas many laser-markable materials absorb at the wavelength of $CO_2$ laser light (10,600 nm), this invention relates to the use of IR absorbers in laser-markable compositions, and particular materials that have been found to have utility as IR absorbers.

According to one aspect of the present invention, an ink composition comprises a pigment, a solvent, a conductive polymer, and optionally also a binder, preferably but not essentially having a labile group.

According to another aspect of the invention, a substrate is marked by the application of an ink including a pigment and an IR-absorber, whereby low energy laser light can be used, wherein the absorber is a conducting polymer. The polymer may function as a binder for the ink composition.

DESCRIPTION OF PREFERRED EMBODIMENTS

An ink formulation to be used in the invention may be water-based, solvent-based, or UV-curable, and it may be a solution or dispersion. The formulation may include a chargeable component, for use in an ink jet printer.

Any suitable pigment may be used. The pigment can be a water-dispersible inorganic or organic additive such as calcium carbonate etc. As described in WO02/07458, it may be an oxyanion-containing compound; the cation may be ammonium or an alkali or alkaline earth metal, but is not critical. The oxyanion may be a molybdate, tungstate or analogous transition metal compound. Such compounds include di-, hepta- and octa-molybdates, and also analogous tungstates etc. The compound is preferably AOM; the following description refers to AOM for the purposes of illustration only.

A binder should preferably be used, and can be one or more of a range of water-soluble or amine-stabilised emulsion polymers, for a water-borne dispersion ink, or a solvent-soluble polymer for a solvent-borne dispersion or solution ink. Acrylic polymers can be used in each case.

The binder and the AOM are intimately mixed with the solvent which may be selected from those usually used for inks and lacquers, e.g. water, ethanol, ethyl acetate, isopropyl alcohol, hydrocarbons, etc. The components may be present in solution and/or dispersion. The amount of the AOM in the ink is typically 1 to 90% by weight. The binder is typically polymeric, and may be selected from commercially-available polymers including acrylics, celluloses, PVOH, polyesters, etc. The binder preferably includes a labile group such as hydroxyl, acetoxy, ether acetal or halogen and this has the function of undergoing elimination reaction, to give a colour-forming entity (see also WO02/068205 and U.S. patent application Ser. No. 10/344,393, the contents of which are incorporated herein by reference).

AOM can be incorporated into various polymer systems and milled, using a bead mill, to a desired particle size, without any technical difficulty. Examples of polymer systems in which AOM has been successfully incorporated and milled include nitrocellulose solution in alcohol/ethyl acetate, cellulose acetate propionate solution in alcohol/ethyl acetate, polyvinyl butyral solution in alcohol/ethyl acetate, solvent-based polyurethane resin, solvent-based epoxide resin, solvent-based polyester resin, water-based acrylic resin, water-based polyester resin, water-based polyurethane resin, solventless ultra violet light curable monomers and oligomers, solvent-based polyamides, solvent-based polyimides, water-based polyamides, water-based polyimides, solvent-based epoxy/vinyl/polyester coatings and lacquers, and siloxane resins.

Organic and inorganic pigments can be incorporated into AOM inks/coatings without any adverse effect on the laser markability of the AOM inks/coatings. Further, the AOM inks/coatings containing the organic and inorganic pigments can be milled to desired particle size without difficulty or adverse affect on the laser markability of AOM inks/coatings.

The AOM component may alternatively be melt-incorporated into extrudable polymers, or it may be incorporated into UV-cure monomer formulations. A film or laminate of layers which include a laser-markable component provides a tamper-proof product. Extrudable polymers which can be used in the invention include nylon, polyesters, polyamide, polycarbonate, polyacrylate, polymethacrylate, ABS graft polymers, polyolefins such as polyethylene or polypropylene, polystyrene, polyvinyl chloride, polyoxymethylene, polyimide, polyethers and polyether ketones, thermoplastic elastomers, thermoplastic polyurethane which may be used individually or as a blend of various polymers, are suitable as the polymer matrix. The amount of AOM that is incorporated is typically 0.1 to 5% by weight of the extrudate.

The colour change that causes an image to be produced on a substrate will typically be the result of a change in valence state and/or the formation of non-stoichiometric products, although there may also be some reaction with the Binder.

The substrate may be board, e.g. cartonboard. Packaging that may be used in the invention may alternatively be in the form of a polymeric film, such as polypropylene or polyethylene, and which may be laminated and used, for example, for wrapping chocolate. If a multi-layer packaging material is used, the invention is applicable at whatever layer the ink is present.

Any pigment that is used in the invention may be conventional. A white pigment may be preferred, providing not only contrast with, say, black bar-coding but also opacity. Other colours may be chosen, as desired. Typical pigments include $CaCO_3$, ZnO, $TiO_2$ and talc.

A formulation of the invention may also include conventional components that are present in order to provide the image. Typically, they include a material that absorbs incident laser light; this material may itself change colour on absorption, or may react with another material to provide a change of colour. Typical reactants include phenols, phenolic resins, carboxylic acids together with a colour-former, e.g. Crystal Violet Lactone. Typical absorbing agents include clays, micas, $TiO_2$, carbonates, oxides, talc, silicates and aluminosilicates.

It will be appreciated by one of ordinary skill in the art that it is possible to incorporate additives of various sorts in the imaging layers, and which might be beneficial in certain circumstances. Such additives include, for example, polymer binders, mild reducing agents to promote thermal printer performance, colorants such as dyes or pigments, antioxidants and other known stabilisers, antiblocking materials such as talc or selected silicas, surfactants or lubricants such as zinc stearate, and materials adsorbent to or reactive with any thermolysis products of laser imaging.

An additive of particular utility, in solution or suspension or in a separate layer, is an electron-donating dye precursor often known as a colour-former. The colour may correspond to that obtained by the use of common colour developers such as certain phenols. Weak block images may also be obtained, e.g. using a heat sealer at 100-120 C and contact times of 1-10 seconds. Thus the amine molybdate acts as an electron acceptor and colour developer for at least some of these colour-formers. The low melting point of amine molybdates means that they can be fused with colour-formers, if desired.

Protective polymer or other layers on the imaging layer may be useful in some circumstances. For example, such layers may prevent or reduce mechanical or chemical damage to the unexposed or exposed thermally sensitive layers of the invention. Layers comprising mild reducing agents may also be added to promote thermal printer performance. Such layers may also act to reduce emanation of any thermolysis products of laser imaging. Such layers can be applied by known means such as lamination or coating.

As indicated above, an image can be formed by the application of heat. Preferably, heat is applied locally, on irradiation with a laser. This invention allows the use of a low-energy laser, such as a diode laser, typically emitting light at a wavelength in the range of 800-1500 nm. This energy input may be insufficient to cause the desired reaction, and for this purpose the composition to be irradiated comprises a suitable absorbent material.

A conducting polymer for use in this invention is a material that, in the polymerised state, comprises linked monomers (typically rings) that are conjugated and which can therefore allow delocalisation/conduction of positive or negative charge. The conjugation allows an absorption shift that can be controlled such that it applies to the wavelength of irradiation, and which may also depend on the concentration of the polymer.

Examples of monomers that can be conjugated to give suitable conducting polymers are aniline, thiophene, pyrrole, furan and substituted derivatives thereof. Such polymers, in addition to providing the desired means of transferring heat from a low-power laser, have the advantage that they do not readily diffuse out of the coating material. They can also act as the polymer binder. Yet another advantage of such materials is that they can be colourless, even at high loading (up to 5% by weight); this is by contrast to monomeric species that have been used, such as phthalocyanine, which absorb at about 800 nm but give the composition a greenish tinge, even at a loading of 0.1% by weight.

Depending on the components to be irradiated, a black or coloured image may be obtained. The colour may be dependent on the irradiation power; thus, for example, a blue colour may be overpowered to black.

Multi-colour printing may also be achieved, e.g. using different colour-formers (and, if necessary, absorbers) responsive to different irradiation wavelengths. For example, UV, diode and $CO_2$, lasers may be used to give three-colour printing, by providing appropriate, different colour formers at different/overlapping locations on the substrate. The laser that is used can operate in either the dot matrix mode or continuous-wave, scribing mode.

The initial colour of coating and image achieved on activation is not limited. Theoretically, any initial or final colour (red, blue, green, etc) is achievable and the energy required to develop the image (e.g. 100-140° C./2-4 Watts) can be controlled within a range. Additionally, a step-change of the image colour produced can be controlled with activation (e.g. 150-200° C./3-5 Watts), and so more than one distinct colour is possible from the same coating.

The IR-sensitive coating can be applied by a range of methods such as flood coating, flexo/gravure etc.

The IR-sensitive coating can be applied to a range of substrates such as self-adhesive label etc.

A protective layer of a film-forming water-borne top-coat ink can be applied onto the IR-sensitive coating.

The following Examples illustrate the invention, but are not intended to be limiting in scope.

Example 1

Water-Borne Dispersion Inks

The effect of the presence of an IR absorber in an ink formulation was determined. Blue and red water-based acrylic-emulsion inks of PVOH-stabilised dispersion (comprising PBI2RN or PR16B colour former) were assessed.

A "standard" formulation was used, comprising the following proportions of components (% w/w):

| | |
|---|---|
| Binder | 26.5 |
| Active Pigment | 26.9 |
| Fluid | 46.6 |

Various "active" formulations were used, each containing the IR absorber Baytron P (HC Starck), a conducting polymer. The proportions of IR absorber used were 1.0, 2.5 and 5.0% (w/w). In, for example, formulations comprising 5.0% Baytron P, the composition was:

| | |
|---|---|
| Binder | 25.2 |
| Active Pigment | 25.6 |
| Fluid | 44.2 |
| IR Absorber | 5.0 |

The components were selected from:

| | |
|---|---|
| Binder | Gohsenol GH-17 polyvinyl alcohol and Texicryl acrylic emulsion; |
| Active Pigment | HC Starck AOM; |
| Colour Former | Pergascript blue I-2RN crystal violet lactone and red I-6B; |
| Fluid | water, dilute ammonium hydroxide etc; and |
| IR Absorber | Baytron P |

A 940 nm Rofin Dilas DF060 Diode Laser and K-bar 2.5-coated substrates were used for image forming.

The results are shown in Table 1. A good image was obtained when Baytron P was present.

TABLE 1

| IR Absorber | Level (% w/w) | Unimaged | Imaged (940 nm) |
|---|---|---|---|
| — | n/a | White | No Image |
| — | n/a | " | " |
| Baytron P | 5.0 | Off-white (slight) | Black Image |
| " | 5.0 | " | " |

Samples of the blue ink formulations were coated with K-bar 2.5 onto Rafaltac Raflacoat (RC) and Hi-Fi polyester (PE) substrates. The coated substrates were then used for Nd:YAG (1064 nm) laser text imaging. Two formulations comprised Baytron P, two did not. The results are shown in Table 2.

TABLE 2

| IR Absorber at 5.0% (w/w) | Substrate | Unimaged | Imaged (1064 nm) |
|---|---|---|---|
| — | RC | White | No Image |
| Baytron P | RC | Off-White (grey) | Black Text |
| — | PE | White | No Image |
| Baytron P | PE | Off-White (grey) | BlackText |

The coatings in which Baytron P was absent gave no image or very faint text. PE-based samples gave better results than RC-based ones. Where images were obtained (i.e. when Baytron P was present), they were sharp and well-defined.

Examples 2 to 4

Coated samples were exposed to near-IR diode laser source. Inks were applied by manual drawdown with K-bar 2.5 onto self-adhesive paper. Imaging was observed after exposure to near-IR diode laser source Rofin Sinar Dilas DF060 Laser. Details are shown in Table 3.

TABLE 3

| Example | Additive | Substrate |
|---|---|---|
| 2 | 5.0% Baytron P (in IPA) | RC |
| 3 | 5.0% Baytron P (Aq.) | RC |
| 4 | 5.0% Baytron P (in IPA) | RC |

Example 5

The following were formulated:

| | |
|---|---|
| 41.65% | Ethanol B |
| 13.89% | Ethyl Acetate |
| 17.68% | Elvacite 2028 |
| 21.21% | Ammonium Octamolybdate |
| 0.81% | Aerosil 200 |
| 4.76% | Baytron P (CPP4531E3D) |

Ethanol B and ethyl acetate were loaded. Mechanical stirring was started at low speed using a leading edge trailing blade stirrer. Elvacite 2028 was added over 10 mins into vortex of liquid, and stirred for 30 mins until fully dissolved. Ammonium octamolybdate was added over 5 mins into vortex of liquid, and stirred for 30 mins until fully dispersed. Aerosil 200 was added over 10 mins into vortex of liquid, and stirred for 15 mins until fully dispersed.

Solvent-compatible mechanical mill was primed with ethanol B/ethyl acetate in the ratio 3:1. That was milled for 2 passes, and collected after the last pass.

The IR absorber was introduced into the liquid. Using addition of various size distribution ceramic balls to effect dispersion, the sample and container were placed on the roller mill for several hours until fully dispersed.

Example 6

The following were formulated:

| | |
|---|---|
| 10.27% | Water |
| 0.73% | Gohsenol GH-17 |
| 25.67% | Ammonium Octamolybdate |
| 58.56% | Scott Bader Texicryl 13-011 |
| 4.76% | Baytron P (CPP4531E3D) |

Boiling water was subjected to mechanical stirring at low speed using a leading edge trailing blade stirrer. Gohsenol GH-17 was added over 10 mins into a vortex of hot liquid, and stirred for 30 mins until fully dissolved. Ammonium octamolybdate was added into vortex of liquid, and stirred for 30 mins until fully dispersed.

A water compatible mechanical mill was primed with water, and stirred for 30 mins until fully mixed. That was milled for 2 passes, and collected after last pass.

Texicryl 13-011 was added to milled liquid over 5 mins. The IR absorber was then introduced into liquid. Using addition of various size distribution ceramic balls to effect dispersion the sample and container were placed on the roller mill for several hours until fully dispersed.

Coatings

Examples 5 and 6 were coated onto self-adhesive paper substrate with K-bar 2.5 drawdown application. 1 and 2 hits were applied to generate sufficient coat weight.

Samples were sectioned to provide representative portions for imaging evaluation.

Imaging

Coated samples of Examples 5 and 0.6 were exposed to the Rofin Sinar Dilas DF060 Laser, a diode laser source at near-IR wavelengths. At an appropriate setting, power at between 1 and 4 Watts and dwell time at 70 milliseconds, an image was observed.

The invention claimed is:

1. A composition that comprises a laser-markable material that absorbs radiation at a wavelength of 10,600 nm, a solvent, and a conductive polymer;
    wherein the conductive polymer absorbs IR radiation;
    wherein the laser-markable material forms a mark by absorbing the radiation when irradiated with a laser at a wavelength of 10,600 nm;
    wherein the laser-markable material comprises a multivalent metal that undergoes a colour change due to a change in oxidation state, on irradiation; and
    wherein the laser-markable material is ammonium octamolybdate.

2. The composition according to claim 1, wherein the conductive polymer comprises linked monomers that are conjugated and which, therefore, allow delocalization/conduction of a positive or negative charge.

3. The composition according to claim 2, wherein the monomers that are conjugated are selected from aniline, thiophene, pyrrole, furan and substituted derivatives thereof.

4. The composition according to claim 1, which additionally comprises a colour-former.

5. The composition according to claim 4, which comprises a colourless electron-donating dye precursor.

* * * * *